US005803430A

United States Patent [19]

Buchl

[11] Patent Number: 5,803,430

[45] Date of Patent: Sep. 8, 1998

[54] METHOD AND APPARATUS FOR DIVERTING ELECTROSTATIC CHARGES IN INLET PIPE MADE AT LEAST IN PART OF A PLASTIC MATERIAL

[75] Inventor: Josef Buchl, Lenting, Germany

[73] Assignee: Audi AG, Germany

[21] Appl. No.: 612,688

[22] Filed: Mar. 8, 1996

[30] Foreign Application Priority Data

Mar. 10, 1995 [DE] Germany ........................ 195 08 625.2

[51] Int. Cl.[6] ........................ F16K 31/02

[52] U.S. Cl. ........................ 251/129.11; 251/305

[58] Field of Search ........................ 251/129.11, 129.15, 251/129.01, 305; 123/399; 307/91; 137/1

[56] References Cited

U.S. PATENT DOCUMENTS

| | | | |
|---|---|---|---|
| 3,809,924 | 5/1974 | Grunow et al. | 307/125 |
| 4,629,910 | 12/1986 | Early et al. | 307/317 R |
| 4,915,074 | 4/1990 | Arai | 251/129.11 X |
| 5,255,891 | 10/1993 | Pearson et al. | 251/129.11 |

*Primary Examiner*—Kevin Lee

*Attorney, Agent, or Firm*—Rosenblatt & Redano, P.C.

[57] ABSTRACT

In an internal combustion engine having a butterfly valve driven by an electric motor and located within an inlet pipe made at least in part of a plastic material, electrostatic charges forming in the area of the inlet pipe are diverted away by a connection, containing a resistor, located between the butterfly valve section and the terminals of the electric motor used to control the butterfly valve's regulating flap.

5 Claims, 1 Drawing Sheet

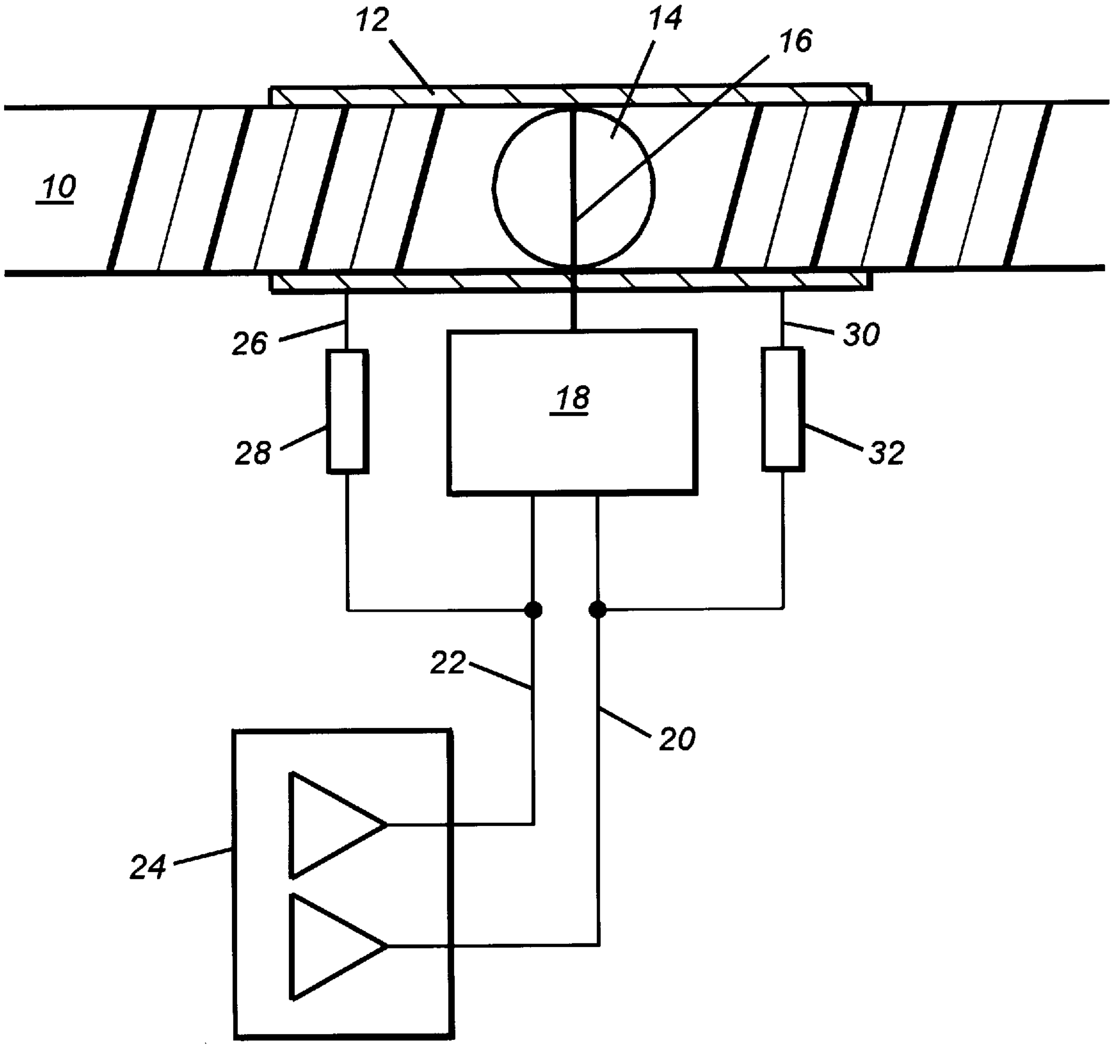
12
14
16
10
26
30
18
28
32
22
20
24

METHOD AND APPARATUS FOR DIVERTING ELECTROSTATIC CHARGES IN INLET PIPE MADE AT LEAST IN PART OF A PLASTIC MATERIAL

FIELD OF THE INVENTION

The field of the invention relates to inlet pipes for internal combustion engines, and particularly to diverting electrostatic discharge when the inlet pipe is made at least in part of a plastic material.

BACKGROUND OF THE INVENTION

Increasingly, inlet pipes in internal combustion engines are made at least in part of a plastic material. In such arrangements, a butterfly valve section fitted with a regulating flap to control the air flow is installed in the area of the inlet pipe. The regulating flap is controlled by an electric motor supplied with an excitation current regulated by a control unit, allowing the electric motor to set the regulating flap position.

Problems in such arrangements occur in the form of electrostatic charges in the inlet pipe area, caused in particular by the plastic material. Discharges (i.e., voltage arcing) of such electrostatic charges, particularly in the area of the metal butterfly valve section, present serious problems, especially for the engine electronics.

In the prior art, such discharges are dealt with using ground bands. The involved areas are fitted with metal bands or metal meshes connected to the vehicle mass, thus diverting the electrostatic discharges.

It is an object of the present invention to provide a simple method for otherwise diverting such electrostatic discharges.

SUMMARY OF THE INVENTION

In an internal combustion engine having an inlet pipe made at least in part of a plastic material, electrostatic charges forming in the area of the inlet pipe are diverted by a connection between the butterfly valve section and the terminals of the electric motor used to control the butterfly valve's regulating flap.

BRIEF DESCRIPTION OF THE DRAWING

The figure is a schematic illustration of one possible arrangement of the connections used to divert electrostatic charges in accordance with the present invention.

DETAILED DESCRIPTION OF THE INVENTION

Charges forming in the area of the inlet pipe are diverted by an electrically conductive line connected to the terminal of the electric motor which controls the butterfly valve's regulating flap. This takes advantage of the fact that the electric motor is controlled in a low-impedance manner and that the control unit is fitted with spark arresters in the final stage modules to reduce voltage peaks caused by the high inductivity of the electric motor. The invention thus counteracts electrostatic charges in a simple and cost-effective manner without adding any weight to the system.

Preferably, two lines to the electric motor are connected to the outside wall of the butterfly valve section to cut the resulting voltage potential in half and to prevent possible high-frequency problems due to the antenna effect.

In the embodiment illustrated in the figure, inlet pipe 10 may be made of a plastic material. Butterfly valve section

12, which usually has a housing made of metal, is located downstream of inlet pipe 10, supported in an electrically insulated manner. Butterfly valve section 12 is fitted with regulating flap 14 which rotates on shaft 16, thus opening or closing inlet pipe 10. Shaft 16 of regulating flap 14 is activated by electric motor 18.

Electric motor 18 is supplied with electric power through two lines 20, 22 connected to its terminals and is controlled by control unit 24. Control unit 24, illustrated schematically, forms a conventional part of an electronic butterfly valve control system or of a no-load filling control system.

Electric connections 30, 26 are installed between the wall of butterfly valve section 12 and electric supply lines 20, 22 leading to electric motor 18. Thus each of the two connections provides a connection between electric motor 18 and the wall of butterfly valve section 12.

Resistors 32, 28 installed in electric connections 30, 26 between butterfly valve section 12 and electric motor supply lines 20, 22 ensure that there will be no short-circuit of the excitation current for electric motor 18. Thus resistors 32, 28 should exhibit high impedance.

Electrostatic charges forming in the area of the inlet pipe 10 are diverted by way of electric connections 26, 30 to the electric motor terminals, where they may be discharged in a low-impedance manner by way of the final stages of control unit 24 used to control electric motor 18. In that regard, spark arresters are preferably installed in the final stages of control unit 24, reducing inductive voltage peaks in the electric motor and, at the same time, destroying electrostatic voltage peaks. In that manner, electrostatic charges are diverted with a minimum of circuit requirements.

The foregoing disclosure and description of the invention are illustrative and explanatory thereof, and various changes in the size, shape and materials, as well as in the details of the illustrated construction, may be made without departing from the spirit of the invention.

What is claimed is:

1. An apparatus for diverting electrostatic charges in an inlet pipe; said apparatus having a butterfly valve section and a regulating flap controlled by an electric motor having a plurality of terminals, the apparatus comprising:

an automotive fluid inlet pipe made at least in part of a plastic material;

a first electrically conductive connection between the butterfly valve section and at least one terminal of the electric motor;

a second electrically conductive connection between the butterfly valve section and another terminal of the electric motor; and a resistor placed within said first electrically conductive connection.

2. A method of diverting electrostatic charges in an inlet pipe; said apparatus having a butterfly valve section and a regulating flap controlled by an electric motor having a plurality of terminals, comprising the steps of:

providing a first electrically conductive connection between the butterfly valve section and at least one terminal of the electric motor;

providing a second electrically conductive connection between the butterfly valve section and another terminal of the electric motor; and providing a resistor in said first electrically conductive connection.

3. An inlet pipe apparatus comprising:

an automotive fluid inlet pipe made at least in part of a plastic material;

a metallic butterfly valve housing supported by said inlet pipe;

a regulating flap disposed within said butterfly valve housing, said regulating flap including and rotating about a shaft;

an electric motor coupled to said shaft, said electric motor having a plurality of terminals;

an electrically conductive connection between said butterfly valve housing and at least one of said terminals; and a resistor placed within said electrically conductive connection.

4. An apparatus for diverting electrostatic charges in an inlet pipe; said apparatus having a butterfly valve section and a regulating flap controlled by an electric motor having a plurality of terminals, the apparatus comprising:

an automotive fluid inlet pipe made at least in part of a plastic material;

an electrically conductive connection between the butterfly valve section and at least one terminal of the electric motor; and a resistor placed within said electrically conductive connection.

5. A method of diverting electrostatic charges in an inlet pipe; said apparatus having a butterfly valve section and a regulating flap controlled by an electric motor having a plurality of terminals, comprising the steps of:

providing an electrically conductive connection between the butterfly valve section and at least one terminal of the electric motor; and providing a resistor in said electrically conductive connection.

* * * * *